United States Patent [19]

Muramatsu et al.

[11] Patent Number: 5,326,607
[45] Date of Patent: Jul. 5, 1994

[54] AMORPHOUS CARBON SUBSTRATE FOR A MAGNETIC DISK AND A METHOD OF MANUFACTURING THE SAME

[75] Inventors: Kazuo Muramatsu; Nobuhiro Ohta; Shunsuke Takada; Motoharu Sato; Masami Takao; Hiroko Nagata; Satoru Takada, all of Kobe, Japan

[73] Assignee: Kabushiki Kaisha Kobe Seiko Sho, Kobe, Japan

[21] Appl. No.: 676,569

[22] Filed: Mar. 28, 1991

[30] Foreign Application Priority Data

| Mar. 29, 1990 | [JP] | Japan | 2-83137 |
| Aug. 31, 1990 | [JP] | Japan | 2-231069 |
| Nov. 26, 1990 | [JP] | Japan | 2-324941 |
| Dec. 12, 1990 | [JP] | Japan | 2-410434 |
| Dec. 12, 1990 | [JP] | Japan | 2-410435 |
| Dec. 12, 1990 | [JP] | Japan | 2-410436 |

[51] Int. Cl.$^5$ .............................................. C01B 31/02
[52] U.S. Cl. ........................................ 428/65; 360/131; 360/135; 428/64; 428/141; 428/167; 428/408; 428/694 SG; 428/694 ST; 428/694 TS; 428/694 TC
[58] Field of Search ............... 428/65, 64, 900, 408, 428/220, 694 SG, 694 ST, 694 TS, 694 TC, 141, 167; 360/135, 131

[56] References Cited

U.S. PATENT DOCUMENTS

| 4,716,078 | 12/1987 | Kishine et al. | 428/408 |
| 4,774,140 | 9/1988 | Wakasa | 428/408 |
| 5,045,298 | 9/1991 | Muramatsu et al. | 423/445 |

FOREIGN PATENT DOCUMENTS

| 214539 | 3/1987 | European Pat. Off. |
| 62-234232 | 10/1987 | Japan |

Primary Examiner—Ellis P. Robinson
Assistant Examiner—Nasser Ahmad
Attorney, Agent, or Firm—Oblon, Spivak, McClelland, Maier & Neustadt

[57] ABSTRACT

The surface of a blank for a textured amorphous carbon substrate is polished in a surface with a predetermined surface roughness, and then the blank with a polished surface is heated at a predetermined temperature in an oxidizing atmosphere to form minute irregularities in the polished surface through a reaction expressed by $C+O_2=CO_2$ so that the surface is textured in an appropriate surface roughness. A randomly textured amorphous carbon substrate has a randomly textured surface with a surface roughness Ra in the range of 20 to 100 Å and the ratio $Ra_2/Ra_1$, where $Ra_1$ is the surface roughness with respect to a circumferential direction, and $Ra_2$ is the surface roughness with respect to a radial direction, in the range of 0.75 to 1.25 Å. A concentrically textured amorphous carbon substrate has a concentrically textured surface with a surface roughness Ra in the range of 30 to 100 Å or in the range of 40 to 200 Å, and the ratio $Ra_2/Ra_1$ of 1.75 or greater.

4 Claims, No Drawings

5,326,607

AMORPHOUS CARBON SUBSTRATE FOR A MAGNETIC DISK AND A METHOD OF MANUFACTURING THE SAME

PRIOR ART

The present invention relates to an amorphous carbon substrate for a magnetic disk, having a surface textured to prevent sticking between the surface of the magnetic disk and the surface of a floating magnetic head and to a method of manufacturing such an amorphous carbon substrate, incorporating an improved texturing process.

A conventional magnetic disk is fabricated by forming a magnetic film over the surface of a Ni-P plated aluminum substrate. In recording data on or reproducing recorded data from a magnetic disk on a magnetic disk unit, a floating magnetic head is held afloat over the rotating magnetic disk. In some cases, the surface of the floating magnetic head sticks to the surface of the magnetic disk while the magnetic disk is stopped. Such a sticking phenomenon is attributable to a large attraction resulting from interfacial tension between the surface of the floating magnetic head and the surface of the magnetic disk when the surface of the floating magnetic head and that of the magnetic disk are very smooth, the floating magnetic head is disposed with an infinitesimal gap between its surface and the surface of the magnetic disk, and the infinitesimal gap is filled with molecules of $O_2$, $N_2$ or $H_2O$. In starting a motor for driving the magnetic disk under such a sticking phenomenon, the motor consumes much electric energy.

To prevent the sticking phenomenon, the surface of an aluminum substrate for a magnetic disk is mirror-finished, the mirror-finished surface is textured to control the surface roughness, and then a magnetic film is formed over the textured surface of the aluminum substrate. According to a known texturing process, an abrasive tape is pressed against the surface of a rotating Ni-P plated aluminum substrate with a roller, and the abrasive tape is moved radially along the surface of the Ni-P plated aluminum substrate. The abrasive tape is such as formed by bonding abrasive grains, such as silicon carbide grains, alumina grains or diamond grains, to the surface of a tape. Thus, such a mechanical texturing process textures the surface of the Ni-P plated aluminum substrate with concentric, circular streaks, i.e., a concentric texture.

Another conventional magnetic disk employs an amorphous carbon substrate such as proposed in Kobe Seiko Giho, vol. 39, No. 4, pp.35-38 (1989). The amorphous carbon substrate is lightweight, has a high strength, excellent heat resistance and excellent surface accuracy, and forms a magnetic disk capable of recording data in a bit density higher than that of a magnetic disk employing an aluminum substrate.

However, it is very difficult to finish the surface of an aluminum substrate for a magnetic disk in a surface with an appropriate surface roughness by the conventional mechanical texturing process; the surface is liable to be textured in a surface with an excessive roughness. Although it is preferable to reduce the height of the magnetic head from the surface of the magnetic disk, i.e., the spacing, to enhance the bit density, the excessively rough surface of the aluminum substrate of a magnetic disk entails inevitably increase in the spacing to reduce the bit density. Furthermore, thorough studies of the surface roughness of the conventional amorphous carbon substrate for the prevention of sticking and the improvement of magnetic recording characteristics have not been made so far.

SUMMARY OF THE INVENTION

It is an object of the present invention to enable the practical application of an amorphous carbon substrate, which is lightweight and has a high strength, excellent heat resistance and surface accuracy, as the substrate of a magnetic disk.

Another object of the present invention is to provide an amorphous carbon substrate for a magnetic disk, capable of preventing sticking between a magnetic head and the magnetic disk, of improving the characteristics of the magnetic film and of reducing the spacing between the magnetic head and the magnetic disk, and a method of manufacturing such an amorphous carbon substrate.

It is a further object of the present invention to provide a magnetic disk obtained by forming a magnetic film over such an amorphous carbon substrate.

According to the present invention, an amorphous carbon substrate is surface-finished by a random texturing process or by a concentric texturing process. An amorphous carbon substrate surface-finished by the random texturing process is suitable particularly for a magnetic disk employing a high-quality magnetic film having excellent recording and reproducing characteristics, while an amorphous carbon substrate surface-finished by the concentric texturing process is suitable for forming a magnetic disk employing a magnetic film of comparatively low cost.

A randomly textured amorphous carbon substrate for a magnetic disk, in accordance with the present invention is featured by its surface with a surface roughness Ra in the range of 20 to 100 Å, and the ratio $Ra_2/Ra_1$ ($Ra_1$ is the circumferential surface roughness, and $Ra_2$ is the radial surface roughness) in the range of 0.75 to 1.25.

A concentrically textured emorphous carbon substrate for a magnetic disk, in accordance with the present invention is featured by its surface with a radial surface roughness Ra in the range of 30 to 500 Å, and concentric, circular streaks marked in its polished surface.

Another concentrically textured amorphous carbon substrate for a magnetic disk, in accordance with the present invention is featured by its surface with a surface roughness Ra in the range of 40 to 200 Å, and the ratio $Ra_2/Ra_1$ not less than 1.75.

A method of manufacturing a randomly textured amorphous carbon substrate for a magnetic disk, in accordance with the present invention is characterized by a process of polishing the surface of an amorphous carbon substrate, and a process of heating the amorphous carbon substrate at a predetermined temperature in an oxidizing atmosphere.

The method of manufacturing a randomly textured amorphous carbon substrate for a magnetic disk, in accordance with the present invention is characterized by a polishing process for polishing the surface of an amorphous carbon substrate in a surface with a surface roughness Ra in the range of 5 to 40 A and with the ratio $Ra_2/Ra_1$ in the range of 0.85 to 1.15, and a heating process for heating the polished amorphous carbon substrate in an atmosphere of oxygen.

A method of manufacturing a concentrically textured amorphous carbon substrate for a magnetic disk, in accordance with the present invention is characterized by a polishing process for polishing the surface of an amorphous carbon substrate in a surface with a surface roughness Ra in the range of 5 to 50 Å and with the ratio $Ra_2/Ra_1$ not less than 1.50, and a heating process for heating the polished amorphous carbon substrate in an atmosphere of oxygen.

An amorphous carbon substrate in accordance with the present invention is formed of high density amorphous carbon having characteristics substantially the same as those of graphite, scarcely having pores and having a density of 1.80 g/cm³ or higher, and obtained by subjecting hard carbon to hot isostatic pressing process.

DETAILED DESCRIPTION OF THE PREFERRED EMBODIMENTS

The inventors of the present invention made studies of methods of texturing amorphous carbon substrates taking into consideration the properties of amorphous carbon substrates and found that the surfaces of amorphous carbon substrates can be finished in a textured surface with an appropriate surface roughness by heating an amorphous carbon substrate at a predetermined temperature in an oxidizing atmosphere after polishing the surface of the amorphous carbon substrate in a surface with a predetermined surface roughness.

When a surface-finished amorphous carbon substrate is heated at a predetermined temperature, the amorphous carbon substrate undergoes an oxidation reaction expressed by $c+O_2=CO_2$, $C+1/2O_2=CO$, $C+H_2O=CO+H_2$, and thereby carbon is gasified to form minute irregularities in the polished surface. Thus, the surface of the amorphous carbon substrate can readily be finished in a surface with an appropriate surface roughness by selectively determining conditions for the heating process and hence the surface is will not be finished in a surface with an excessively high surface roughness. The amorphous carbon substrate having such a surface with an appropriate surface roughness prevents sticking between a magnetic head and the surface of a magnetic disk employing the amorphous carbon substrate to enable the reduction of the spacing between the magnetic head and the magnetic disk, and improves the characteristics of a magnetic film formed over the surface of the amorphous carbon substrate.

A randomly textured or concentrically textured amorphous carbon substrate for a magnetic disk, in accordance with the present invention can be manufactured through such a texturing process.

(1) First Embodiment: Randomly Textured Amorphous Carbon Substrate for a Magnetic Disk The significance of the surface roughness Ra and the ratio $Ra_2/Ra_1$ ($Ra_1$: circumferential surface roughness, $Ra_2$: radial surface roughness) of a randomly textured amorphous carbon substrate for a magnetic disk, in a first embodiment according to the present invention will be described hereinafter.

An amorphous carbon substrate having a surface finished in a random texture, namely, a surface with a surface roughness Ra the same with respect to a circumferential direction and with respect to a radial direction, reduces recording and reproducing errors, and noise (S/N ratio) in recording data in and in reproducing recorded data from a magnetic disk employing the amorphous carbon substrate and enhances the bit density of the magnetic disk. However, when the ratio $Ra_2/Ra_1$ is not in the range of 0.75 to 1.25, recording and reproducing errors and noise (S/N ratio) increases. Accordingly, the ratio $Ra_2/Ra_1$ must be in the range of 0.75 to 1.25.

If the surface roughness (average surface roughness) Ra is smaller than 20 Å, sticking between a magnetic head and the magnetic disk is liable to occur. If the surface roughness Ra exceeds 100 Å, it is difficult to reduce the spacing below 0.1 μm. Accordingly, the surface roughness Ra must be in the range of 20 to 100 Å.

Since an amorphous carbon substrate for a magnetic disk, in accordance with the present invention is capable of increasing the bit density of a magnetic disk employing the same and of reducing the spacing between the magnetic head and the magnetic disk, the amorphous carbon substrate is suitable particularly for forming a high-performance magnetic disk.

Samples of randomly textured amorphous carbon substrates embodying the present invention, and amorphous carbon substrates as controls not meeting the conditions for surface roughness of the present invention will be described.

First, methods of manufacturing the amorphous carbon substrates embodying the present invention and those as controls will be described.

Blanks for substrates were formed by hot-pressing a mixed resin of a thermosetting resin and a phenol-formaldehyde resin in the shape of a magnetic disk, the blanks were heated at about 1450° C. in an atmosphere of $N_2$ gas for preburning. Then, the preburnt blanks were burnt at about 2900° C. under an isostatic pressure of about 3000 atm on a HIP (hot isostatic pressing) apparatus for hot isostatic pressing. Then, the burnt blanks were subjected to end face finishing and surface polishing to obtain 3.5 in. diameter semifinished amorphous carbon substrates.

Then, the semifinished amorphous carbon substrates were subjected to a texturing process, in which the semifinished amorphous carbon substrates were polished under different polishing conditions for texturing. Substrate cartridges each containing twenty-five polished amorphous carbon substrates were heated in the atmosphere, namely, in the presence of oxygen, at a predetermined temperature for a predetermined time to obtain Samples 1 to 7 of the amorphous carbon substrate embodying the present invention and Controls 1 to 4.

The surface roughness Ra of each of the Samples 1 to 7 of the textured amorphous carbon substrate embodying the present invention and Controls 1 to 4 was measured and the ratio $Ra_2/Ra_1$ for each textured amorphous carbon substrate was calculated. The surface roughness Ra was measured by a surface roughness tester Talystep ® (Rank Taylar Hobson Co.) under the following measuring conditions.

Diameter of Stylus: 2.5 μn
Stroke : 1 mm
Cutoff value : 0.08 mm
Magnification : ×1,000,000 Vertical
Measured results are shown in table 1.

The amorphous carbon substrates were cleaned perfectly, a CoNiCr medium layer (magnetic film) and a protective carbon film were formed successively on each of the amorphous carbon substrates by a magnetron sputtering apparatus, and then, a lubricant was applied to the surface of the protective carbon film to obtain magnetic disks.

The characteristics of the magnetic disks employing the samples of the amorphous carbon substrate embodying the present invention and those employing the controls were measured by using a tester Disk Certifier ® (Proquip Co.) and the measured results were evaluated in terms of sticking, head crush, recording and reproducing characteristics and noise characteristics. The results of evaluation are shown in Table 1. In measuring the characteristics of the magnetic disk, the spacing between the magnetic head and the magnetic disk was about 0.08 μm.

As is obvious from Table 1, neither sticking nor head crush occurred with the magnetic disks employing Samples 1 to 7 even though the spacing was as small as about 0.08 μm, and the magnetic disks employing Samples 1 to 7 had excellent recording and reproducing characteristics and excellent noise characteristics.

Sticking occurred with the magnetic disk employing Control 1 having a surface with a surface roughness Ra of 15 Å, which is considered to be attributable to the excessively small surface roughness Ra. Head crush occurred with the magnetic disk employing Control 2 having a surface roughness Ra of 120 Å and the magnetic head could not be disposed with a spacing of about 0.08 μm, which is considered to be attributable to the excessively large surface roughness Ra. Excessive recording and reproducing errors occurred with the magnetic disks employing Controls 3 and 4 respectively being 0.71 and 1.28 in the ratio $Ra_2/Ra_1$, which is considered to be attributable to directional textures, and the noise characteristics of the same magnetic disks were not satisfactory.

As is apparent from the foregoing description, the amorphous carbon substrate for a magnetic disk, in accordance with the present invention having a randomly textured surface with a surface roughness Ra in the range of 20 to 100 Å and the ratio $Ra_2/Ra_1$ in the range of 0.75 to 1.25 is capable of preventing sticking between the magnetic head and the magnetic disk, of reducing the spacing between the magnetic head and the magnetic disk and of improving the recording and reproducing characteristics of the magnetic film formed thereon. This amorphous carbon substrate is suitable particularly for application to a high-performance magnetic disk.

(2) Second Embodiment: Concentrically Textured Amorphous Carbon Substrate for a Magnetic Disk A concentrically textured amorphous carbon substrate for a magnetic disk, in a second embodiment according to the present invention will be described hereinafter.

A principal purpose of texturing an amorphous carbon substrate for a magnetic disk is to prevent sticking between a magnetic head and the magnetic disk. When a concentric texture is formed on the surface of an amorphous carbon substrate, namely, when the surface roughness of an amorphous carbon substrate with respect to a radial direction is greater than that with respect to a circumferential direction, the coercive force and the rectangularity ratio with respect to a circumferential direction are greater than those with respect to a radial direction by 20 to 30%. Since the magnetic head moves in a circumferential direction relative to the magnetic disk in a recording or reproducing operation, the circumferential magnetic characteristics of the magnetic film are improved remarkably by the concentric texture. Therefore, the magnetic characteristics of the magnetic film (medium layer) can be improved without adding an expensive element, such as Pt or Ta, to the magnetic film.

The concentrically textured amorphous carbon substrate is provided with concentric circular streaks in its surface and the surface roughness Ra of the surface with respect to a radial direction is in the range of 30 to 500 Å. Such a surface condition prevents sticking between the magnetic head and the magnetic disk, enhances the magnetic anisotropy with respect to a circumferential direction, namely, a direction along the streaks, and improves the magnetic characteristics with respect to the direction of movement of the magnetic head relative to the magnetic disk.

A suitable surface roughness Ra with respect to a radial direction of the concentrically textured amorphous substrate is in the range of 30 to 500 Å. A surface roughness Ra less than 30 Å does not have sufficient effect on the prevention of sticking and on the improvement of magnetic characteristics with respect to a circumferential direction, and a surface roughness Ra exceeding 500 Å is excessively large and spoils the stability of the floating condition of the magnetic head.

Concentrically textured amorphous carbon substrates in the second embodiment according to the present invention will be described hereinafter, in which amorphous carbon substrates provided in their surfaces with concentric circular streaks in accordance with the present invention are denoted as textured amorphous carbon substrates, and amorphous carbon substrates having surfaces finished only by polishing are denoted as polished amorphous carbon substrates.

EXAMPLE 1

Manufacture of polished amorphous carbon substrates will be described prior to the description of textured amorphous carbon substrates of the present invention. Blanks for substrates were formed in the shape of a magnetic disk by hot-pressing a phenol-formaldehyde resin, i.e., a thermosetting resin which can be burnt into hard carbon, and then the blanks were heated at 1500° C. in an atmosphere of $N_2$ gas for preburning. Then, the preburnt blanks were burnt at 2600° C. under an isostatic pressure of 1800 atm on a HIP apparatus for hot isostatic pressing. Then, the blanks were subjected to end face finishing and surface polishing to obtain 3.5 in. diameter polished amorphous carbon substrates having a mirror-finished surface with a surface roughness Ra of 20 Å.

Then, an abrasive tape was pressed against the polished amorphous carbon substrates and was moved radially for texturing while the polished amorphous carbon substrates were rotated so that concentric, circular streaks were marked on the surfaces of the polished amorphous carbon substrates to obtain textured amorphous carbon substrates. Conditions for this texturing process were: quality of the abrasive tape: #6000, the rotating speed of the amorphous carbon substrate: 800 rpm, hardness of the roller: 90, pressure on the abrasive tape: 0.5 to 2 kg/cm², texturing time: 1 min, coolant: 5% Yushiroken ® MIC-5 aqueous solution (Yushiro Kagaku K.K.).

The surface roughness Ra of the textured amorphous carbon substrates with respect to a radial direction was measured by a surface roughness tester DEKTAK ®. Measured results are shown in Table 2. Then, a 3000 Å thick Cr film (under layer), a 600 Å thick $Co_{70}Ni_{17}Cr_{13}$ film (magnetic layer) and a 300 Å thick C film (protective layer) were formed sequentially in that order on the textured amorphous carbon substrates by a dc magnetron sputtering apparatus to obtain sample magnetic disks. The coercive force with respect to a circumferential direction and coercive force with respect to a radial direction of these sample magnetic disks were measured by a vibrating sample magnetometer (VSM). The sample magnetic disks were subjected to sticking tests for ten days in a high-temperature, high-humidity (85%) atmosphere to evaluate the sticking preventing ability of the sample magnetic disks. Measured results are shown in Table 2. Magnetic disks as controls were fabricated by using the polished amorphous carbon substrates. The coercive force of the controls were measured and the sticking preventing ability of the same was evaluated.

As is obvious from Table 2, the sample magnetic disks employing the textured amorphous carbon substrates in accordance with the present invention have excellent sticking preventing ability and improved magnetic characteristics with respect to a circumferential direction.

EXAMPLE 2

A textured amorphous carbon substrate as example 2 having a surface with concentric, circular streaks and with a surface roughness in a predetermined range is obtained by marking the concentric, circular streaks on the surface of the polished amorphous carbon substrate with an abrasive tape to texture the surface of the polished amorphous carbon substrate and subjecting the textured amorphous carbon substrate to a heating process to oxidize the surface of the same.

Polished amorphous carbon substrates of 3.5 in. in diameter each having a surface with a surface roughness Ra of 20 Å were manufactured by the same procedure as that employed in manufacturing the example 1. Concentric, circular streaks of a very small depth were marked with an abrasive tape in the surfaces of the polished amorphous carbon substrates. Conditions for texturing the polished amorphous carbon substrates were: quality of abrasive tape: #6000, rotating speed of the amorphous carbon substrate: 800 rpm, hardness of the roller: 90, pressure on the abrasive tape: 0.5 kg/cm$^2$, texturing time: 1 min. coolant: 5% Yushiroken $^R$MIC-5 (Yushiro Kagaku K.K.) aqueous solution.

Then, the amorphous carbon substrates each having a surface with the concentric, circular streaks of a very small depth were heated at 600° C. for different times in the range of 20 to 60 min in the atmosphere in an electric furnace to complete textured amorphous carbon substrates. During the heating process, carbon was gasified and an oxidation reaction expressed by $C+O_2 = CO_2$, $C+1/2O_2 = CO$, $C+H_2O = CO+H_2$ occurred to oxidize selectively the streaks marked with the abrasive tape so that the depth of the streaks are adjusted properly. The textured amorphous carbon substrates were processed by the same magnetic disk manufacturing procedure as that employed in manufacturing the example 1 to obtain sample magnetic disks. The surface roughness of the textured amorphous carbon substrates and the characteristics of the sample magnetic disks are shown in Table 3. The characteristics and performance of the magnetic disks are satisfactory.

(3) Third Embodiment: Concentrically Textured Amorphous Carbon Substrate for a Magnetic Disk A concentrically textured amorphous carbon substrate in a third embodiment according to the present invention will be described hereinafter.

When the ratio $Ra_2/Ra_1$ is less than 1.75, the circumferential texture is unsatisfactory and the circumferential magnetic characteristics of the magnetic film (medium layer) cannot satisfactorily be improved. Accordingly, the ratio $Ra_2/Ra_1$ must be 1.75 or greater.

A magnetic disk employing an amorphous carbon substrate having a surface with a surface roughness Ra smaller than 40 Å is liable to cause sticking between the magnetic head and the magnetic disk. On the other hand, a magnetic disk employing an amorphous carbon substrate having a surface with a surface roughness Ra exceeding 200 Å is unable to reduce the spacing between the magnetic head and the magnetic disk. Accordingly, the surface roughness Ra of the amorphous carbon substrate must be in the range of 40 to 200 Å.

The amorphous carbon substrate in accordance with the present invention reduces the spacing between the magnetic head and the magnetic disk, and is suitable particularly for an inexpensive magnetic disk because the amorphous carbon substrate improves the magnetic characteristics of a magnetic film formed thereon and not containing any expensive element, such as Pt or Ta.

A concentrically textured amorphous carbon substrate embodying the present invention, and an amorphous carbon substrate as a control having a surface with a surface roughness not meeting conditions required by the present invention will be described hereinafter.

A method of manufacturing the coaxially textured amorphous carbon substrate embodying the present invention and the control is the same as that of manufacturing the randomly textured amorphous carbon substrate and hence the description thereof will be omitted.

Square test pieces of $5^2$ mm$^2$ were cut from sample magnetic disks respectively employing the concentrically textured amorphous carbon substrate of the present invention and the control. The magnetostatic characteristics with respect to a circumferential direction and with respect to a radial direction of the test pieces were measured.

Sticking preventing ability and head crush preventing ability of the magnetic disks were tested and the radial and circumferential coercive forces of the same were measured by disposing a MIG (metal-in-gap) magnetic head with a spacing of about 0.15 μm. The results of tests are shown in Table 4.

As is obvious from Table 4, the sample magnetic disks respectively employing Samples 1 to 4 of the concentrically textured amorphous carbon substrate embodying the present invention caused neither sticking nor head crush even if the spacing between the magnetic head and the magnetic disk was as small as about 0.15 μm, and had a high coercive force Hc. Magnetic disks respectively employing Controls 1 and 2 having surfaces with a surface roughness Ra less than 40 Å caused sticking, which is considered to be attributable to an excessively small surface roughness Ra.

Since the magnetic disks respectively employing Controls 1 and 2 have the ratio $Ra_2/Ra_1$ less than 1.75, the circumferential coercive force Hc thereof was not improved. The magnetic disks respectively employing Controls 3 and 4 having surfaces with a surface roughness Ra exceeding 200 Å caused head crush and were not able to reduce the spacing between the magnetic head and the magnetic disk.

As is apparent from the foregoing description, the concentrically textured amorphous carbon substrate in accordance with the present invention having a surface with a surface roughness Ra in the range of 40 to 200 Å and the ratio $Ra_2/Ra_1$ of 1.75 or greater is able to prevent sticking between the magnetic head and the magnetic disk, to reduce the spacing between the magnetic head and the magnetic disk and to improve the circumferential magnetic characteristics of the magnetic film remarkably. The concentrically textured amorphous carbon substrate is suitable particularly for an inexpensive magnetic disk having a magnetic film not containing any expensive element, such as Pt or Ta.

(4) Method of Manufacturing Amorphous Carbon Substrates for Magnetic Disks

A method of manufacturing an amorphous carbon substrate for a magnetic disk, in accordance with the present invention will be described hereinafter.

The method embodying the present invention polishes the surface of an amorphous carbon substrate in a surface with a predetermined surface roughness, and then heats the amorphous carbon substrate at a predetermined temperature in an oxidizing atmosphere to form minute, wavy irregularities in the polished surface by an oxidation reaction expressed by $C+O_2=CO_2$. Heating conditions are determined selectively so that the surface of the amorphous carbon substrate may not be roughened excessively and may be textured in an appropriate surface roughness.

Suitable heating temperature is in the range of 400° to 700° C. A heating temperature below 400° C. requires a relatively long time for toughening the surface of the amorphous carbon substrate. A heating temperature higher than 700° C. forms an excessively rough surface.

The method of manufacturing an amorphous carbon substrate, in accordance with the present invention will be described hereinafter.

First, blanks for substrates were formed by hot-pressing a phenol-formaldehyde resin, i.e., a thermosetting resin that is burnt into hard carbon, in the shape of a magnetic disk, and then the blanks were burnt at 1500° C. in an atmosphere of $N_2$ gas for preburning. Then, the preburnt blanks were burnt at 2600° C. under an isostatic pressure of 1800 atm on a HIP apparatus for hot isostatic pressing to obtain semifinished amorphous carbon substrates. The semifinished amorphous carbon substrates were subjected to end face finishing and mirror-finishing to obtain 3.5 in. diameter amorphous carbon substrates for magnetic disks, each having a surface with a surface roughness Ra in the range of 20 to 23 Å.

The amorphous carbon substrates were divided into lots each of twenty-five amorphous carbon substrates contained in a stainless steel cartridge. The lots of the amorphous carbon substrates were heated in an electric furnace in the atmosphere at different temperatures for different times shown in Table 5, respectively, for texturing. For comparison, some of the amorphous carbon substrate each having a polished surface with a surface roughness Ra in the range of 20 to 23 Å were textured with an abrasive tape by the foregoing procedure. Conditions for texturing using the abrasive tape were: quality of the abrasive tape: #6000, pressure on the abrasive type: 2 kg, rotating speed of the roller: 800 rpm, hardness of the roller: 90, texturing time: 2 min.

The surface roughness Ra of thus manufactured amorphous carbon substrates were measured. Measured results are shown in Table 5.

As is obvious from Table 5, when the heating temperature for texturing is in the range of 400° to 700° C. the mirror-finished surface of the amorphous carbon substrate could be textured in a surface with a surface roughness Ra in the range of 30 to 100 Å enclosed by thick lines in Table 5 by selectively determining the heating time. In texturing the amorphous carbon substrate at a relatively low temperature on the order of 400° C., the heating time may be curtailed by increasing the oxygen concentration of the atmosphere.

Magnetic disks were fabricated by processing the textured amorphous carbon substrates. The magnetic disks were subjected to sticking tests on a dynamic friction tester. The mirror-finished amorphous carbon substrates were heated for texturing respectively under different heating conditions: 500° C.×60 min, 600° C.×10 min and 700° C.×5 min. Then, a 1500 Å thick Cr film (under layer), a 600 Å thick CoNiCr film (magnetic layer) and a 500 Å thick C film (protective layer) were formed sequentially in that order on each of the textured amorphous carbon substrates by sputtering to fabricate the magnetic disks. Those films are formed also on amorphous carbon substrates having surfaces textured with an abrasive tape and on those having polished surfaces to fabricate magnetic disks as controls. The magnetic disks as controls also were subjected to sticking tests.

The results of the sticking tests are shown in Table 6. As is obvious from Table 6, although sticking did not occur with the magnetic disk employing the amorphous carbon substrate having a surface textured with the abrasive tape by a conventional texturing method, the spacing could not be reduced below 0.2 μm.

On the other hand, the magnetic disks employing the amorphous carbon substrates textured in accordance with the present invention did not cause sticking and reduced the spacing to 0.1 μm or less.

(5) Method of Manufacturing Randomly Textured Amorphous Carbon Substrates for Magnetic Disks The surfaces of amorphous carbon substrates are polished in surfaces with a surface roughness in a predetermined range by the foregoing method, and then the polished amorphous carbon substrates are heated in an oxidizing atmosphere to texture the surfaces of the amorphous carbon substrates.

The surfaces of the amorphous carbon substrates are polished so that the surface roughness Ra is in the range of 5 to 40 Å and the ratio $Ra_2/Ra_1$ is in the range of 0.85 to 1.15.

The arrangement of the random texture is dependent on the mode of surface polishing. If the ratio $Ra_2/Ra_1$ is outside the range of 0.85 to 1.15, it is impossible to form a randomly textured surface with the ratio $Ra_2/Ra_1$ in the range of 0.75 to 1.25 by the subsequent heating process, and the recording and reproducing errors and noise (S/N ratio) of magnetic disks employing amorphous carbon substrates with the ratio $Ra_2/Ra_1$ outside the range of 0.75 to 1.25 increase. Therefore, the surfaces of the amorphous carbon substrates must be polished so that the ratio $Ra_2/Ra_1$ is in the range of 0.85 to 1.15.

If the surface roughness Ra (average surface roughness) of the polished amorphous carbon substrate is less than 5 Å, a magnetic disk employing such an amorphous carbon substrate is liable to cause sticking. If the surface roughness Ra of the polished amorphous carbon substrate is greater than 40 Å, it is difficult to reduce the spacing between a magnetic head and a magnetic disk employing such an amorphous carbon substrate to 0.1 μm or less. Accordingly, the surface roughness Ra of the polished amorphous carbon substrates must be in the range of 5 to 40 Å.

A method of polishing the amorphous carbon substrate in a surface roughness in the foregoing range will be described. An inexpensive, industrial, abrasive grains having a hardness equal to or higher than that of the amorphous carbon substrate are used for finish polishing. Preferably, abrasive grains of diamond, alumina, SiC, $ZrO_2$, selenium oxide, $SiO_2$ or a mixture of some of these substances is used for polishing. The surface roughness of the polished amorphous carbon substrate is dependent on the grain size of the abrasive grains. Defects, such as scratches, are formed in the surface of the amorphous carbon substrate and it is difficult to polish the surface in a desired accuracy if the average grain size exceeds 1 $\mu$m. Scratches are oxidized locally and are enlarged into grooves in the subsequent heating process to form surface flaws in the surface. Such surface flaws deteriorate the durability of a magnetic disk employing such a defective amorphous carbon substrate in practical application. Abrasive grains of a substance other than those mentioned above may be used. However, abrasive grains having insufficient abrasiveness form minute pits, i.e., so-called orange peels, in the surface of the amorphous carbon substrate. Abrasive grains of an average grain size of 1 $\mu$m or less polish the surface of the amorphous carbon substrate in a mirror-finished surface with a surface roughness of 40 Å or below.

Preferably, a soft surface plate, such as a Sn surface plate or a Cu surface plate is used. Since the amorphous carbon substrate, as compared with an aluminum substrate, is brittle, abrasive grains tumbles about on a hard surface plate, such as a cast iron surface plate, to form many surface flaws including scratches, orange peels and chipping in the surface of the amorphous carbon substrate. Abrasive grains bite in the surface of a soft surface plate and are unable to tumble about, so that the abrasive grains do not form such surface flaws.

The surface of the soft surface plate must be dressed after the soft surface plate has been used for a predetermined period. To reduce the frequency of dressing, a composite surface plate fabricated by attaching a hard pad of a hardness of 60 or higher, such as a polyurethane pad, to the surface of a soft or hard surface plate may be used. Such a composite surface plate, similarly to a soft surface plate, prevents forming surface flaws in the surface of the amorphous carbon substrate and reduces maintenance cost because the composite surface plate can be repaired simply by replacing the hard pad with a new one. It is preferable to use abrasive grains of at least one of diamond, alumina, SiC, $ZrO_3$, selenium oxide and $SiO_2$, and a soft surface plate or a composite surface plate with a hard pad of a hardness of 60 or higher for polishing the surface of the amorphous carbon substrate.

A random texture can be formed by the following method. The amorphous carbon substrate is pressed against the surface of a soft surface plate or the hard pad of a composite surface plate wetted with a slurry of the foregoing abrasive grains, and the amorphous carbon substrate is rotated and revolved to polish the surface in a randomly textured surface with a ratio $Ra_2/Ra_1$ in the range of 0.85 to 1.15.

Then, the randomly textured amorphous carbon substrate is heated at a temperature in the range of 300° to 1000° C., preferably, 400° to 700° C., to cause an oxidation reaction expressed by $C+O_2=CO_2$. The heating temperature and the heating time are determined selectively so that the surface of the randomly textured amorphous carbon substrate may be finished in a randomly textured surface with an appropriate surface roughness.

A method of manufacturing a randomly textured amorphous carbon substrate for a magnetic disk, embodying the present invention, randomly textured amorphous carbon substrates manufactured by the method, and randomly textured amorphous carbon substrates as controls not meeting the requirements of the present invention will be described hereinafter.

A mixture of a thermosetting resin, which is converted into amorphous carbon by carbonization, and a phenol-formaldehyde resin was hot-pressed in the shape of a magnetic disk to obtain blanks for amorphous carbon substrates, and then the blanks were burnt for preburning at about 1850° C. in an atmosphere of $N_2$ gas. Then, the preburnt blanks were burnt at about 2150° C. under an isostatic pressure of about 3000 atm on a HIP apparatus for hot isostatic pressing to obtain amorphous carbon substrates.

The amorphous carbon substrates were textured under different texturing conditions.

Effects of Finish Polishing Using a Soft Surface Plate

The amorphous carbon substrates were polished for rough polishing on a double side polishing machine 16B (Speedfam Co.) by using cast iron surface plates wetted with a slurry of SiC abrasive grains. Conditions for the rough polishing were: abrasive concentration of the slurry: 35% by weight, pressure on the work: 300 g/cm$^2$, rotating speed of the lower surface plate: 100 rpm, slurry feed rate: 600 ml/min, polishing time: 45 min.

Then, the rough-polished amorphous carbon substrates were subjected to ultrasonic cleaning to remove the abrasive grains completely. Then, the rough-polished amorphous carbon substrates were finish-polished on a single side polishing machine 12B by using a Sn surface plate. When some of the rough-polished amorphous carbon substrates were finish-polished by using an cast iron surface plate for comparison, visible chipping occurred in the surface of the amorphous carbon substrates due to the tumbling of the abrasive grains. Abrasive slurries containing $ZrO_2$ abrasive grains respectively of different average grain sizes were used for finish-polishing to obtain Samples 1 to 5 and Controls 1 to 4 respectively having different surface roughnesses Ra and different ratios $Ra_2/Ra_1$. Measured surface roughnesses Ra and the ratios $Ra_2/Ra_1$ of Samples 1 to 5 and Controls 1 to 4 are shown in Table 7.

The finish-polished amorphous carbon substrates were heated under predetermined conditions in the atmosphere (in the presence of oxygen) to finish Samples 1 to 5 and Controls 1 to 4.

The measured surface roughnesses Ra and ratios $Ra_2/Ra_1$ of the finished Samples 1 to 5 and finished Controls 1 to 4 are shown in Table 7.

The amorphous carbon substrates in Samples 1 to 5 and Controls 1 to 4 were cleaned perfectly, a CoNiCr film (magnetic film) and a carbon film (protective film) were formed in that order on each of the amorphous carbon substrates by a magnetron sputtering apparatus, and then a lubricant was applied to the surfaces of the amorphous carbon substrates to obtain 3.t in. diameter magnetic disks.

The magnetic disks employing Samples 1 to 5 and those employing Controls 1 to 4 were tested for sticking, head crush and noise characteristics by a tester Disk Certifier ® (Proquip Co.). Test results are shown in Table 7. In the tests, the spacing between the magnetic disk and the magnetic head was about 0.08 μm.

As is obvious from Table 7, all the magnetic disks employing Samples 1 to 5 did not cause head crush when the spacing was as small as about 0.08 μm and had excellent noise characteristics.

The magnetic disk employing the Control 1 with a finish-polished surface with a surface roughness Ra of 51 Å caused head crush during recording and reproducing operation due to the excessively large surface roughness Ra of the textured surface of Control 1 and made the reduction of the spacing to a satisfactorily small value difficult. Since the randomness of the texture of Control 1 could not be controlled properly, the noise characteristics of the magnetic disk employing Control 1 were not satisfactory. The magnetic disks employing Controls 2 to 4 having finish-polished surfaces with ratios $Ra_2/Ra_1$ outside the range of 0.85 to 1.15 were not satisfactory in noise characteristics due to inappropriate randomness of the textures formed in the surfaces of Controls 2 to 4. The magnetic disks employing Controls 2 and 4 caused head crush.

Effects of Finish Polishing Using a Hard Pad

Amorphous carbon substrates were rough-polished by the same method as that previously described with reference to the preparation of the amorphous carbon substrates to be finish-polished by using the soft surface plate.

The rough-polished amorphous carbon substrates were cleaned by ultrasonic cleaning to remove thoroughly the abrasive grains used for rough-polishing. Then, the rough-polished amorphous carbon substrates were polished for finish polishing on a double side polishing machine 9B by using surface plates each provided with a hard pad having a high hardness, such as a polyurethane pad. Slurries of abrasive grains of $ZrO_2$, diamond, SiC, $Al_2O_3$, $SiO_2$ and/or selenium oxide, respectively having different average grain sizes each of 1 μm or less were used to finish-polish the amorphous carbon substrates in surfaces differing from each other in surface roughness Ra and the ratio $Ra_2/Ra_1$. Conditions for the finish polishing were: abrasive grain concentration of the slurry: 5% by weight, pressure on the work: 350 g/cm², rotating speed of the lower surface plate: 80 rpm, slurry feed rate: 20 ml/min, polishing time: 18 min.

Magnetic disks were fabricated by the same procedure as that described in the preceding section and the characteristics of the magnetic disks were evaluated.

The magnetic disks employing the amorphous carbon substrates finish-polished by using the surface plate with the hard pad and having surfaces meeting the requirements of the present invention did not cause head crush even if the spacing between the magnetic head and the magnetic disk was as small as about 0.08 μm and were excellent in noise characteristics.

As is apparent from the foregoing description, the method embodying the present invention is capable of providing a randomly textured amorphous carbon substrate having a surface with an appropriate surface roughness by polishing the surface of an amorphous carbon substrate for a magnetic disk in a surface with a surface roughness Ra in the range of 5 to 40 Å and the ratio $Ra_2/Ra_1$ in the range of 0.85 to 1.15 and heating the polished amorphous carbon substrate in the presence of oxygen. Accordingly, a magnetic disk employing the randomly textured amorphous carbon substrate prevents sticking between the magnetic head and the magnetic disk and enables the reduction of the spacing to improve the recording and reproducing characteristics of the magnetic film formed on the randomly textured amorphous carbon substrate. The randomly textured amorphous carbon substrate is suitable particularly for fabricating a high-performance magnetic disk.

(6) Method of Manufacturing Concentrically Textured Amorphous Carbon Substrates for Magnetic Disks A method of manufacturing concentrically textured amorphous carbon substrates will be described hereinafter.

A process of manufacturing concentrically textured amorphous carbon substrates is the same as that of manufacturing the randomly textured amorphous carbon substrates, except that polishing conditions for concentrically textured amorphous carbon substrates are different from those for the foregoing randomly textured amorphous carbon substrates.

This method polishes the surface of an amorphous carbon substrate in a surface with a surface roughness Ra in the range of 5 to 50 Å and the ratio $Ra_2/Ra_1$ of 1.50 or greater.

If the surface roughness Ra of the polished surface is less than 5 Å, a magnetic disk employing the thus polished amorphous carbon substrate is liable to cause sticking. If the surface roughness Ra of the polished amorphous carbon substrate exceeds 50 Å, a magnetic disk employing thus polished amorphous carbon substrate is unable to reduce the spacing between the magnetic head and the magnetic disk. Accordingly, the surface of the amorphous carbon substrate must be polished in a surface with a surface roughness Ra in the range of 5 to 50 Å.

As stated above, the arrangement of the concentric texture is dependent on the mode of surface polishing, which is carried out before heating. If the polished surface has the ratio $Ra_2/Ra_1$ less than 1.50, it is impossible to form a concentrically textured surface with the $Ra_2/Ra_1$ of 1.75 or greater and it is impossible to improve the circumferential magnetic characteristics of a magnetic film formed on that surface satisfactorily. Accordingly, the surface of the amorphous carbon substrate must be polished in a surface with the ratio $Ra_2/Ra_1$ of 1.50 or greater.

A method of polishing the surface of an amorphous carbon substrate in a surface with a surface roughness meeting the foregoing conditions will be described hereinafter.

An abrasive, such as an abrasive tape which is used generally for the mechanical texturing of a conventional aluminum substrate for a magnetic disk, is used effectively in the polishing process, in which an abrasive tape pressed against a rotating amorphous carbon substrate is moved radially, for example, from the circumference of the amorphous carbon substrate toward the center of the same. The abrasive tape is fabricated by bonding minute abrasive grains to a tape.

Inexpensive abrasive grains having a hardness equal to or higher than that of the amorphous carbon substrate, such as diamond, alumina, SiC, $ZrO_2$, selenium oxide and $SiO_2$, are used. The surface of the rotating amorphous carbon substrate is ground by the abrasive grains. The rotating speed of the amorphous carbon substrate, the quality of the abrasive tape and the moving speed of the abrasive tape are determined selectively to polish the surface of the amorphous carbon substrate in a surface with a surface roughness Ra in the range of 5 to 50 Å and the ratio $Ra_2/Ra_1$ of 1.50 or greater and to mark concentric, circular streaks on the surface of the amorphous carbon substrate.

A method of manufacturing concentrically textured amorphous carbon substrates embodying the present invention, and a different method of manufacturing amorphous carbon substrate, for comparison, will be described hereinafter.

A mixture of a thermosetting resin, which is converted into amorphous carbon by carbonization, and a phenol-formaldehyde resin was hot-pressed to produce blanks for amorphous carbon substrates, having the shape of a magnetic disk. The blanks were heated for preburning at about 1450° C. in an atmosphere of $N_2$ gas. The preburnt blanks were burnt at about 2350° C. under an isostatic pressure of about 1800 atm on a HIP apparatus for hot isostatic pressing to obtain amorphous carbon substrates.

The amorphous carbon substrates were polished for rough polishing on a double side polishing machine 16B (Speedfam Co.) by using cast iron surface plates wetted with a slurry of SiC abrasive grains. Conditions for the rough-polishing were: abrasive grain concentration of the slurry: 35% by weight, pressure on the work: 300 g/cm², rotating speed of the lower surface plate: 100 rpm, slurry feed rate: 600 ml/min, polishing time: 45 min. The rough-polished amorphous carbon substrates were cleaned by ultrasonic cleaning to remove the abrasive grains thoroughly. Then, each rough-polished amorphous carbon substrates was fixed to and rotated at a rotating speed in the range of 300 to 500 rpm by a rotary shaft and an abrasive tape pressed against the surface of the amorphous carbon substrate was moved radially from the periphery toward the center of the amorphous carbon substrate for finish polishing to mark concentric, circular streaks, i.e., a concentric texture, on the surface of the amorphous carbon substrate. Preferably, an abrasive tape of a quality #6000 or higher formed by bonding abrasive grains of diamond, SiC, $Al_2O_3$, $SiO_2$ and/or $ZrO_2$ to a tape is used.

The amorphous carbon substrates were polished for finish polishing under different finish-polishing conditions to obtain amorphous carbon substrates as Examples 1 to 4 and those as Controls 1 to 3 differing from each other in surface roughness Ra and the ratio $Ra_2/Ra_1$. Measured surface roughnesses Ra and the ratios $Ra_2/Ra_1$ of Examples 1 to 4 and Controls 1 to 3 are shown in Table 8. In the finish-polishing process, the smallest surface roughness, namely, the upper limit of smoothness, was 5 Å. The surface roughness was measured by a surface roughness tester Talystep ® (Rank Taylar Hobson Co.) and measuring conditions were: diameter of the stylus: 2.5 μm, stroke: 1 mm, cutoff: 0.08 mm, magnification: ×1,000,000 vertical.

Then, the finish-polished amorphous carbon substrates were heated at a predetermined time for a predetermined time in the atmosphere (in the presence of oxygen) to complete the textured amorphous carbon substrates as Samples 1 to 4 and Controls 1 to 3.

Measured surface roughnesses Ra and the ratios $Ra_2/Ra_1$ of Samples 1 to 4 and Controls 1 to 3 are shown in Table 8. The textured amorphous carbon substrates were cleaned by ultrasonic cleaning, a Co-NiCr film (magnetic film) and a carbon film (protective film) were formed in that order on each of the textured amorphous carbon substrates by a magnetron sputtering apparatus to produce magnetic disks, and then a lubricant was applied to the magnetic disks to complete the magnetic disks.

The magnetostatic characteristics with respect to a radial direction and with respect to circumferential direction of square test pieces of $5^2$ mm² cut out from Samples 1 to 4 and Controls 1 to 3 were measured. Performance of the magnetic disks employing the textured amorphous carbon substrates in respect of head crush was tested by a tester Disk Certifier ® (Proquip Co.), in which the spacing between the magnetic disk and the MIG (metal-in-gap) head was about 0.15 μm. The results of the tests are shown in Table 8.

As is obvious from Table 8, the magnetic disks employing Samples 1 to 4 did not cause head crush even though the spacing is as small as about 0.15 μm and were excellent in circumferential coercive force Hc.

On the other hand, the magnetic disk employing Control 1, which had a surface roughness Ra of 61 Å as finish-polished and an excessively large surface roughness Ra as textured, caused head crush and was unable to function properly when the spacing is very small. Improvement in circumferential coercive force Hc with the magnetic disks employing Controls 2 and 3, which had the ratio $Ra_2/Ra_1$ less than 1.50 as finish-polished, was insufficient.

As is apparent from the foregoing description, a method of manufacturing a concentrically textured amorphous carbon substrate polishes the surface of an amorphous carbon substrate in a surface with a surface roughness Ra in the range of 4 to 50 Å and the ratio $Ra_2/Ra_1$ of 1.50 or greater, and then heats the polished amorphous carbon substrate in the presence of oxygen to form a concentrically textured surface with an appropriate surface roughness. The concentrically textured amorphous carbon substrate prevents sticking between the magnetic head and the magnetic disk employing the concentrically textured amorphous carbon substrate, enables the reduction of the spacing between the magnetic head and the magnetic head, and remarkably improves the circumferential magnetic characteristics of the magnetic fiim formed thereon. The amorphous carbon substrate in accordance with the present invention is suitable particularly for forming an inexpensive magnetic disk having a magnetic film not containing an expensive element, such as Pt or Ta.

TABLE 1

| No. | Surface roughness (Å) | $Ra_2/Ra_1$ | Sticking | Recording and reproducing characteristic | Noise characteristic | Head crush |
|---|---|---|---|---|---|---|
| Employing sample | | | | | | |
| 1 | 20 | 0.90 | Not occurred | Good | Good | Not occurred |
| 2 | 40 | 0.90 | Not occurred | Good | Good | Not occurred |
| 3 | 80 | 0.90 | Not | Good | Good | Not |

TABLE 1-continued

| No. | Surface roughness (Å) | Ra$_2$/Ra$_1$ | Sticking | Recording and reproducing characteristic | Noise characteristic | Head crush |
|---|---|---|---|---|---|---|
| 4 | 100 | 0.90 | Not occurred | Good | Good | Not occurred |
| 5 | 40 | 0.84 | Not occurred | Good | Good | Not occurred |
| 6 | 40 | 1.02 | Not occurred | Good | Good | Not occurred |
| 7 | 40 | 1.19 | Not occurred | Good | Good | Not occurred |
| Employing control | | | | | | |
| 1 | 15 | 0.90 | Occurred | Good | Good | Not occurred |
| 2 | 120 | 0.90 | Not occurred | Bad | Bad | Occurred |
| 3 | 40 | 0.71 | Not occurred | Bad | Bad | Not occurred |
| 4 | 40 | 1.28 | Not occurred | Bad | Bad | Not occurred |

TABLE 2

| Pressure on abrasive tape (Kg/cm$^2$) | Radial surface roughness Ra (Å) | Coercive force Hc (Oe) Circumferential | Radial | Sticking | Remarks |
|---|---|---|---|---|---|
| 0.5 | 64 | 860 | 800 | Not occurred | Employing sample |
| 1.0 | 140 | 910 | 860 | Not occurred | Employing sample |
| 2.0 | 280 | 960 | 900 | Not occurred | Employing sample |
| Not textured | 20 | 800 | 800 | Occurred | Employing control |

TABLE 3

| Heating condition | Radial surface roughness Ra (Å) | Coercive force Hc (Oe) Circumferential | Radial | Sticking | Remarks |
|---|---|---|---|---|---|
| 600° C. × 20 min. | 78 | 870 | 810 | Not occurred | Employing sample |
| 600° C. × 40 min. | 168 | 920 | 870 | Not occurred | Employing sample |
| 600° C. × 60 min. | 221 | 950 | 890 | Not occurred | Employing sample |

TABLE 4

| No. | Surface roughness Ra (Å) | Ra$_2$/Ra$_1$ | Sticking | Circumferencial coercive force Hc (Oe) | Radial coercive force Hc (Oe) | Head crush |
|---|---|---|---|---|---|---|
| Employing sample | | | | | | |
| 1 | 40 | 1.76 | Not occurrred | 950 | 805 | Not occurred |
| 2 | 80 | 1.95 | Not occurrred | 1050 | 765 | Not occurred |
| 3 | 130 | 1.95 | Not occurrred | 1100 | 676 | Not occurred |
| 4 | 180 | 2.26 | Not occurrred | 1105 | 705 | Not occurred |
| Employing control | | | | | | |
| 1 | 15 | 0.90 | Occurred | 780 | 775 | Not occurred |
| 2 | 20 | 1.50 | Occurred | 820 | 745 | Not occurred |
| 3 | 205 | 2.55 | Not occurrred | 1150 | 695 | Occurred |
| 4 | 300 | 3.00 | Not | 1130 | 710 | Occurred |

TABLE 4-continued

| No. | Surface roughness Ra (Å) | Ra2/Ra1 | Sticking | Circumferential coercive force Hc (Oe) | Radial coercive force Hc (Oe) | Head crush |
|---|---|---|---|---|---|---|
| | | | occurrred | | | |

TABLE 5

| | Surface Roughness After Texturing (Å) | | | | |
|---|---|---|---|---|---|
| | Time | | | | |
| Temperature | 5 min. | 10 min. | 15 min. | 30 min. | 60 min. |
| 300° C. | 23 | 23 | 23 | 23 | 23 |
| 400° C. | 23 | 23 | 23 | 24 | 28 |
| 500° C. | 23 | 24 | 24 | 30 | 32 |
| 600° C. | 26 | 31 | 30 | 32 | 72 |
| 700° C. | 33 | 148 | 250 | — | — |
| 800° C. | 250 | — | — | — | — |

120 to 120 Å with comparative example employing abrasive tape.

TABLE 6

| | Employing sample | | | Employing control | |
|---|---|---|---|---|---|
| Texturing condition | 500° C. × 60 min. | 600° C. × 10 min. | 700° C. × 5 min. | Not textured | Abrasive tape |
| Surface roughness Ra (Å) | 32 | 31 | 33 | 22 | 125 |
| Spacing (μm) | 0.06 | 0.06 | 0.06 | 0.06 | 0.2 |
| Sticking | Not occurred | Not occurred | Not occurred | Occurred | Not occurred |

TABLE 7

| No. | Surface roughness after finish polishing Ra (Å) | Ra2/Ra1 | Surface roughness after texturing Ra (Å) | Ra2/Ra1 | Noise characteristic | Head crush |
|---|---|---|---|---|---|---|
| Employing sample | | | | | | |
| 1 | 5 | 0.90 | 20~100 | 0.92~1.05 | ○ | Not occurred |
| 2 | 21 | 0.95 | 30~100 | 0.98~1.14 | ○ | Not occurred |
| 3 | 38 | 0.96 | 50~100 | 1.08~1.16 | ○ | Not occurred |
| 4 | 21 | 0.85 | 41~100 | 0.90~1.05 | ○ | Not occurred |
| 5 | 20 | 1.13 | 40~100 | 1.15~1.23 | ○ | Not occurred |
| Employing control | | | | | | |
| 1 | 51 | 0.97 | More 110 | 1.35~1.45 | X | Occurred |
| 2 | 22 | 0.50 | More 110 | 0.22~0.55 | X | Occurred |
| 3 | 22 | 1.28 | 45~100 | 1.35~1.80 | X | Not occurred |
| 4 | 22 | 1.50 | 65~180 | 1.56~2.05 | X | Occurred |

TABLE 8

| No. | Surface roughness after finish polishing Ra (Å) | Ra2/Ra1 | Surface roughness after texturing Ra (Å) | Ra2/Ra1 | Coercive force (Hc) Circumferential (Oe) | Radial (Oe) | Head crush |
|---|---|---|---|---|---|---|---|
| Employing sample | | | | | | | |
| 1 | 5 | 1.51 | 40~200 | 1.79 | 1100 | 780 | Not occurred |
| 2 | 21 | 1.56 | 40~200 | 1.98 | 1090 | 768 | Not occurred |
| 3 | 48 | 1.57 | 60~200 | 2.06 | 1120 | 805 | Not occurred |
| 4 | 20 | 1.67 | 40~200 | 1.89 | 1105 | 778 | Not occurred |
| Employing control | | | | | | | |
| 1 | 61 | 2.00 | 210 | 3.15 | 1080 | 765 | Occurred |
| 2 | 22 | 1.22 | 40~200 | 1.35 | 780 | 765 | Not occurred |
| 3 | 21 | 1.43 | 40~200 | 1.56 | 801 | 775 | Not |

TABLE 8-continued

| | Surface roughness after finish polishing | | Surface roughness after texturing | | Coercive force (Hc) | | Head crush |
|---|---|---|---|---|---|---|---|
| No. | Ra (Å) | $Ra_2/Ra_1$ | Ra (Å) | $Ra_2/Ra_1$ | Circumferential (Oe) | Radial (Oe) | |
| | | | | | | | occurred |

We claim:

1. A lightweight, high strength, heat resistant textured amorphous carbon substrate for a magnetic disk, having a textured surface with an average surface roughness Ra in the range of 20 to 100 Å and a ratio $Ra_2/Ra_1$, where $Ra_1$ is the surface roughness of the textured surface with respect to a circumferential direction, and $Ra_2$ is the surface roughness of the textured surface with respect to a radial direction, in the range of 0.75 to 1.25.

2. A lightweight, high strength, heat resistant texture amorphous carbon substrate for a magnetic disk, having an average surface roughness Ra in the range of 40 to 200 Å, and a ratio $Ra_2/Ra_1$, where $Ra_1$ is the surface roughness of the textured surface with respect to a circumferential direction, and $Ra_2$ is the surface roughness of the textured surface with respect to a radial direction of 1.75 or greater.

3. The textured amorphous carbon substrate for a magnetic disk according to claim 1, wherein said substrate has a diameter of 3.5 inches.

4. The textured amorphous carbon substrate for a magnetic disk according to claim 2, wherein said substrate has a diameter of 3.5 inches.

* * * * *